Jan. 12, 1954
J. J. HOPFIELD
2,665,876
DEFORMABLE MICROLEAK VALVE
Filed June 28, 1951
3 Sheets-Sheet 1
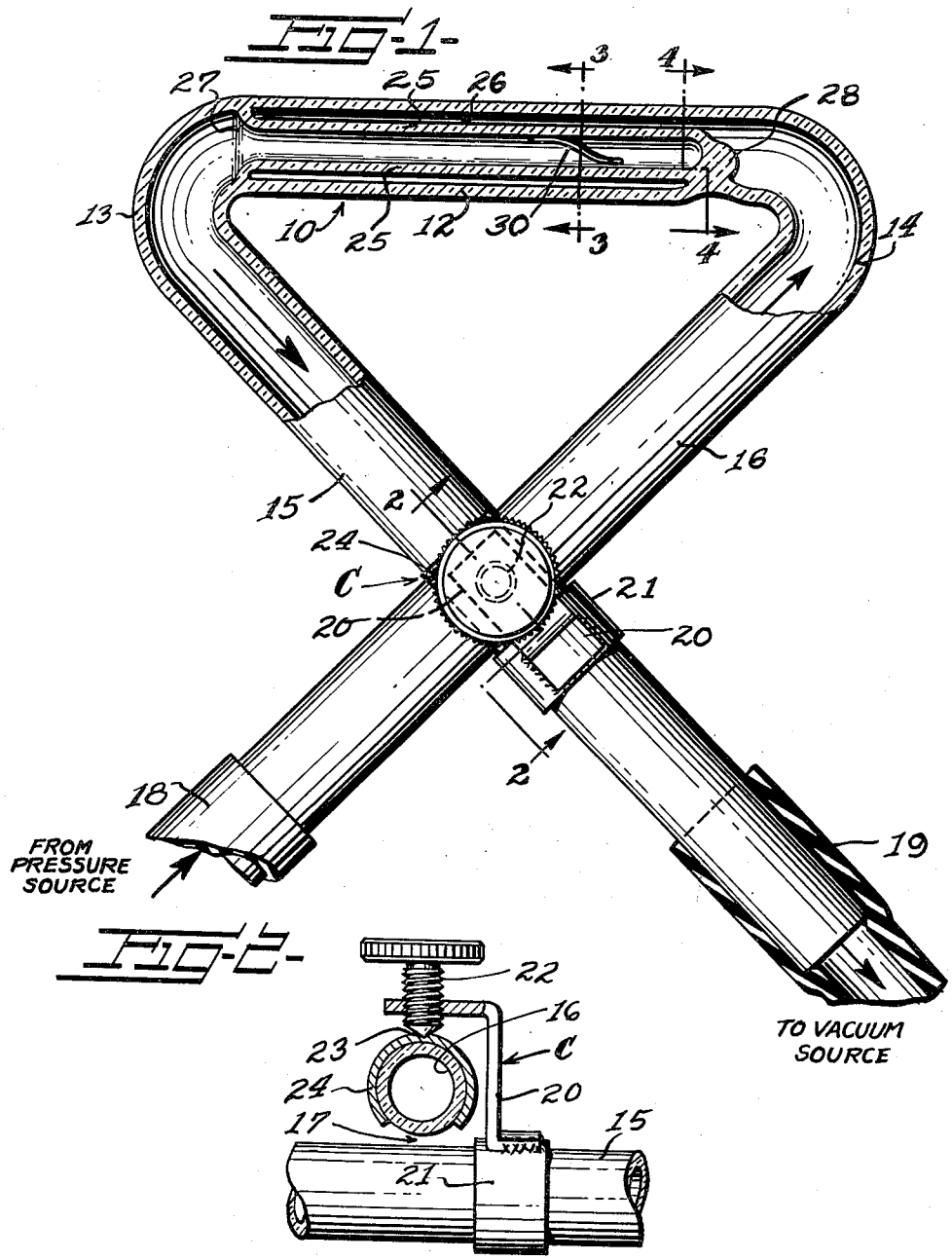
INVENTOR
*John J. Hopfield*
BY
*Lowe & Lowe*
ATTORNEYS Jan. 12, 1954
J. J. HOPFIELD
2,665,876
DEFORMABLE MICROLEAK VALVE
Filed June 28, 1951
3 Sheets—Sheet 2
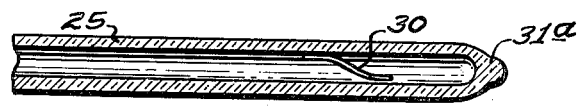
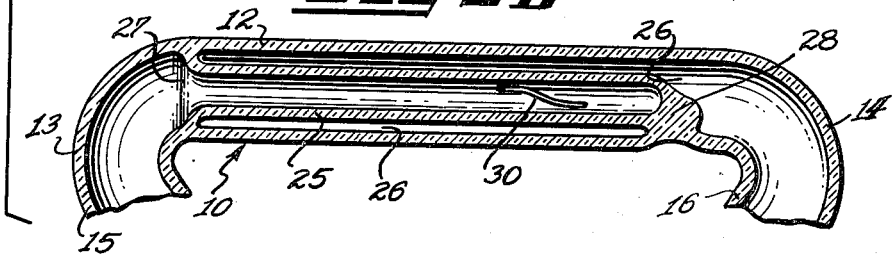
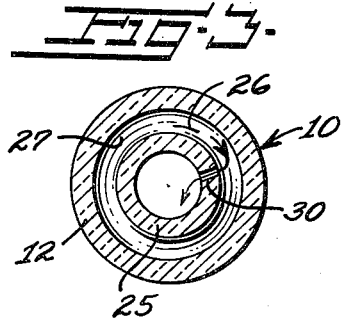
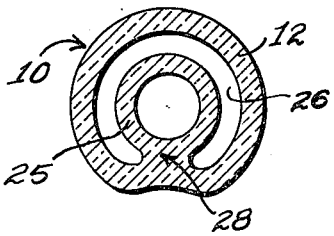
INVENTOR
John J. Hopfield
BY
ATTORNEYS Jan. 12, 1954
J. J. HOPFIELD
2,665,876
DEFORMABLE MICROLEAK VALVE
Filed June 28, 1951
3 Sheets-Sheet 3
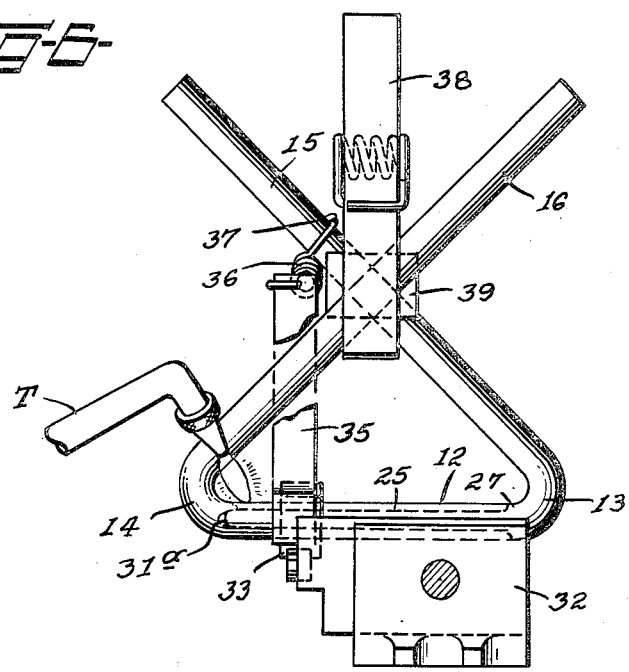
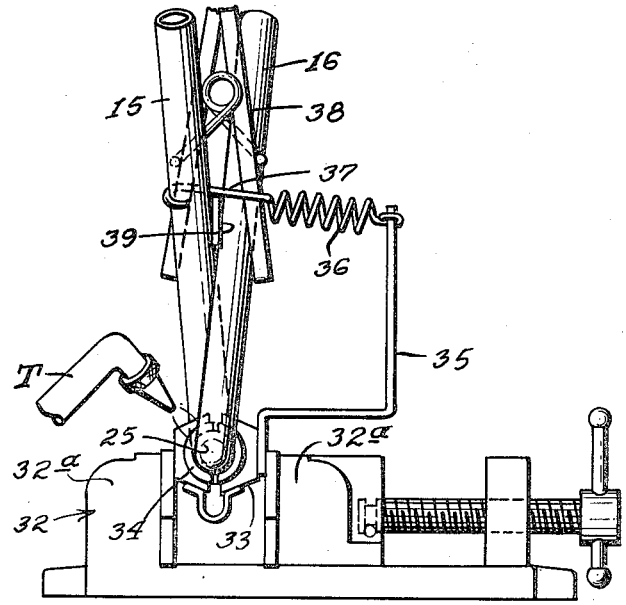
INVENTOR
John J. Hopfield
BY
Lowe & Lowe
ATTORNEYS Patented Jan. 12, 1954

2,665,876

UNITED STATES PATENT OFFICE 2,665,876

DEFORMABLE MICROLEAK VALVE

John J. Hopfield, Bethesda, Md.

Application June 28, 1951, Serial No. 234,083

9 Claims. (Cl. 251—115)

The invention relates to variable microleak valves for fluid pressure or vacuum systems, and also to the method of constructing such a valve.

The invention contemplates the provision of valve means in a fluid pressure or vacuum line, and has particular relation to a microleak valve for controlling as well as accurately determining and recording the rate of leakage or pressure differential between connected sources of pressure and vacuum. The valve structure is such as to permit fine adjustment to be made as to the rate of fluid leakage between said sources, and to permit such leakage or pressure differential to be visually determined and recorded within very minute or microscopic limits.

The invention has particular utility for example in studying gases spectrographically to allow them to flow through a discharge tube and thus to insure their purity. Also it is sometimes desirable to mix flowing gases in any given proportion in a vacuum tube.

In its more specific embodiment the invention comprises a variable glass or Pyrex microleak control valve for gases, consisting of two transparent refractory tubes, one disposed within the other, the inner tube being provided with a helical crack constituting a microleak orifice for gases when a pressure difference of gas exists between the interior and exterior of the inner tube.

The invention is of particular utility in providing an accurate valve device for admitting gas or vapor to a vacuum system at a controlled rate. The invention is further based upon the principle that a leak in a glass tube may constitute a leak of sufficient magnitude to admit appreciable quantities of aeroform fluid into the vacuum system, and that the amount of admitted fluid may be controlled by applying force to the tube to vary the extent of opening or closing of the crack.

A further object of the invention therefore is to provide a variable microleak valve of the described type, including a tube having a normally open or closed crack therein, and means for applying force thereto to vary the degree of leakage through said crack.

Numerous other objects and advantages of the invention will be apparent as it is better understood from the following description which, taken in connection with the accompanying drawings, discloses a preferred embodiment thereof.

In said drawings:

Fig. 1 is a view in side elevation, partially in vertical section of a microleak valve constituting a preferred embodiment of the invention.

Fig. 2 is a sectional view on line 2—2 of Fig. 1.

Fig. 3 is a transverse section on an enlarged scale taken on line 3—3 of Fig. 1.

Fig. 4 is a similar view on line 4—4 of Fig. 1.

Figs. 5A, 5B, 5C and 5D are detail views showing successive steps in the manufacture of a portion of the valve.

Fig. 6 is a side view similar to Fig. 1, with the valve rotated 180° in its plane, and illustrating one of the steps in the process of its construction. Said view is looking from the right hand of Fig. 7.

Fig. 7 is an end view of the valve and associated mechanism for constructing the same, looking from the left hand of Fig. 6.

Referring to the drawings, and with particular reference to Figs. 1 and 2, the valve device comprises an outer hollow cylindrical tubular element 10 preferably formed of refractory material, for example Pyrex or conventional glass tubing, including a substantially straight base portion 12 connected by oppositely curved elbows 13 and 14 to a pair of substantially straight reversely extending integral arm portions or members 15 and 16. The said arm portions are crossed over each other but slightly spaced apart at their point of intersection to provide a clearance space therebetween, as best seen at 17 in Fig. 2. The said arm members 15 and 16 are each open at their outer ends and are or may be respectively communicably connected with a source of vacuum or low pressure and a source of gas at relatively higher pressure.

At or adjacent their point of intersection or reverse crossing the arm members 15 and 16 of the leak valve are preferably connected together for relative movement towards and away from each other, by means of a manually operable clamp device generally indicated at C. Said clamp includes an upstanding bracket member 20 secured by a collar 21 for example to the subjacent hollow cylindrical arm 15. A knurled thumb screw 22 is threadedly mounted in an arm of the bracket 20 and has its pointed outer end 23 in engagement with a spring collar element 24 partially encircling the remaining superposed arm member 16 of the valve.

In the form of the valve illustrated, the upper arm member 16 is normally biased by torque resilience to spring away from the arm 15, thereby normally bearing against the thumb screw 22 to leave the aforesaid variable space 17 between the crossed arm members. By manually turning the thumb screw 22 in opposite directions, the arm members may be moved toward and from each other by applied pressure and spring resilience respectively, as a result of inherent elasticity in the material as well as of steps taken in the manufacture of the valve, thereby varying the degree of space 17 between the crossed arms 15 and 16. This is for a purpose to be presently described.

Referring again to Fig. 1 and also to Fig. 5D of the drawings, the intermediate straight cylindrical portion 12 between the crossed outer arms 15 and 16 of the valve device, is provided with a centrally disposed longitudinally extending tubular insert member 25 slightly spaced inwardly from the outer cylindrical tube wall for the greater portion of its longitudinal extent, thereby leaving an annular restricted space 26 therebetween. One end of the insert member 25 is completely secured as by fusion of a ring seal 27 to the inner wall of the outer tubular portion 12 of the valve to permanently shut off communication at such locality between the hollow arm 15 and the aforesaid annular space 26. The opposite end of the tubular insert member 25 is provided with a spot fuse or weld 28 to locally and integrally secure said insert end to the adjacent inner wall portion of the outer tube 12. A normally open crack 30 of predetermined locality and helical or helicoidal configuration is provided in the intermediate straight body portion of the insert member 25, thereby providing a valve orifice or port for limited or restricted gas flow therethrough from arm member 16 leading to the higher pressure source, and arm member 15 leading to the aforesaid source of vacuum or low pressure. When crack 30 is normally twisted or spread apart to open position as a result of frozen-in torque strain, gas flow between said valve arms 15 and 16 may only be obtained through said crack, as will be readily apparent.

When the helical crack or orifice 30 of the insert member is twisted by applied torque to tightly closed position, as by turning the clamp screw 22 to force the arms together, gas flow between said arms is effectively diminished and in many instances may be completely shut off. In this manner the gas flow between the described high and low pressure sources may be effectually reduced at will be the operator.

In the form of the valve illustrated the helical crack 30 of tubular insert member 25 is normally open and tends to remain open by normal resilience of the material tending to separate the crossed arms 15 and 16 to a fixed and predetermined position, thereby maintaining the space 17 therebetween as best seen in Fig. 2. In such spread apart position of the arms with thumb screw 22 retracted, the crack 30 is open to its maximum extent, thereby affording its maximum gas flow between the valve arms 15 and 16. When the thumb screw 22 is turned down to force valve arm 16 toward arm 15 as best seen in Fig. 2, the result of such applied pressure is a gradual and differential twist of members 12 and 25 which serves to close the crack as the arms approach one another and thus diminish or seal off communication between the respective sources of high and low pressure. By proper manipulation of the clamp screw 22 the desired extent of leakage through the crack 30 may be varied in accordance with operating conditions as desired. The valve may be calibrated and its calibrations remain constant.

From the foregoing it will be apparent that the valve is made to contain a large safety factor against breakage such as would occur if the arms were spread apart too great an amount in opening the crack. The predetermined clearance space 17 prevents over straining or breakage of the valve during the closing operation.

The method of constructing the valve whereby torque strains are initially imparted to the structure to normally bias or twist the helical crack 30 to open position within the elastic limit of the material will now be described, with particular reference to Figs. 5A, 5B, 5C and 5D of the drawings.

A length of conventional glass or Pyrex tubing 25 of desirable relatively small diameter is heated slightly at one end as by a blow torch, and then flash quenched by drawing the heated end of the tube across the surface of a vessel of water. This thermal shock immediately produces a substantially longitudinal crack in said end of the tube, said crack being indicated at 31 in Fig. 5A and extending inwardly from the outer end of the tube. This tube end is again heated to desired temperature, after which it is again quenched while a twisting torque is applied to the tube. This procedure results in the formation of the helical crack 30 leading off from the inner end of the longitudinal crack 31, as shown in Fig. 5B. The sense of the helical crack (right or left) is in the direction of the applied twist. A normally open right hand crack is shown in the drawings for purposes of illustration.

This end of the tube 25 is then closed by fusion and the longitudinal portion of the crack is closed by the application of heat, as shown in Fig. 5C, wherein the closed end of the tube is indicated at 31a. The opposite end of the tube is then scored and broken off to produce the completed insert member 25 (Fig. 1) of desired length.

The insert member 25 closed at one end is then inserted in a straight glass tube 10 of slightly greater diameter or bore, to a desired position intermediate the length of the outer tube. This results in the slight annular clearance groove 26 provided between the inner and outer tubes. By means of a blow torch flame the ring seal 27 is formed and at the same time the adjacent elbow 13 is made in the outer tube, as best seen at the left in Figs. 1 and 5D. The opposite closed end 31a of the insert 25 remains suspended and free of attachment to the outer tube at this stage of the assembly. The straight outer tube is then heated adjacent to and outwardly of the closed end 31a of the inner tube and the elbow 14 is formed. This disposes the insert member 25 between the elbows in the straight portion 12 of the outer tube as best seen in Fig. 1.

The described unitary assembly of the inner and outer integrally fused tubes is then clamped between jaws 32a of a conventional vise 32 (Figs. 6 and 7) with the straight portion 12 of the outer tube securely clamped between opposed portions of a split nut 33 having an inner split bushing or liner 34 formed of asbestos of other heat resisting material to avoid danger of cracking the tube by pressure or thermal shock. This clamping engagement of the split nut 33 is applied by the vise against the outer tube portion 12 at a locality spaced inwardly from the free unattached closed end 31a of the inner tube 25, as best seen in Fig. 6.

The vise and clamping nut assembly includes an upstanding offset substantially rigid bracket member 35 to the upper end of which is secured one end of a coiled tension spring 36. The opposite end 37 of said spring is removably looped around the arm portion 15 of the outer tube and a spring clamp 38 is applied to both arms 15 and 16 at the locality of their crossing or intersection to firmly press said arms against an interposed spacer member or shim 39. This results in tension spring 36 springing both arms 15 and 16 slightly to the right as viewed in Fig. 7.

The refractory material of the straight portion 12 of the outer tube is then heated and softened as by the fine flame of a blow torch T, at a locality slightly inwardly of the elbow 13. This results in the arm 15 moving slightly further to the right as a result of solely supporting the spring tension. This spring tension results in a graded twist in the outer tube (zero twist at the clamping nut 33 and a maximum twist at elbow 13 to which ring seal 27 is attached). It is obvious that the inner tube 25 assumes an orientation corresponding to the maximum twist. Since at this stage the inner tube is anchored to outer tube 12 at only one end (ring seal 27), there is no twisting strain imparted to the inner tube.

The blow torch flame is then utilized to spot weld the outer closed end 31a of the inner tube insert to the adjacent wall of the outer straight tube portion 12, the crack 30 in the inner tube remaining substantially unaffected at this time.

After the material has cooled sufficiently and thus regained its normal resilience, the clamping and spring pressure on the parts is released with the result that reactive torque pressure tends to untwist the outer tube but this untwisting tends to put a countertwist in the inner tube. It is obvious that this countertwist is in a direction to open the right hand helical crack in the inner tube to the maximum extent for which the crack is designed.

The release of the aforesaid clamping and spring pressure on the parts permits the spacer member or shim 39 to drop free thereby leaving the normally desirable intervening space 17, for example .5 mm., between the crossed tube arms 15 and 16. It is the provision of this space or relatively slight clearance that provides for actuation of the previously described thumb screw 22 to force the arms together to close the crack 30 to the desirable extent, the crack being substantially closed and sealed against leakage when the arms are placed in contact by the clamping screw. When the screw is released, the elasticity of the glass material returns the valve crack or orifice to its normal open position.

From the foregoing it will be apparent that the provision of the helical crack 30 in the glass insert member 25 is more responsive to torque or torsional strains to open and close the crack, than would be the case of a straight longitudinal, undulatory crack, such as indicated at 31 in Fig. 5A. In other words, a slight torque pressure or reflex action in one direction would open or close the crack to a greater degree, and vice versa in the opposite direction, depending upon whether the helical crack 30 is in normal open or closed position.

In constructing a valve wherein the crack 30 is normally in closed position, it is merely necessary to place arm 15 on top of arm 16 and put the spring tension to the left in the vice assembly, as viewed in Fig. 7, tension spring 36 remaining attached to and pulling on arm 15.

From the foregoing it will be apparent that the procedure of making the instant glass variable microleak valves may be varied as follows:

The inner tube insert may be constructed with a closing strain frozen into the crack when the crossed arms are in relaxed or spaced apart position, thereby opening the crack when the arms are pressed together. Alternately an opening strain may be frozen into the crack constituting the leak, so that the crack is open to its maximum amount when the arms are in relaxed or spread apart position. Pressure upon the arms to move them together within definitely prescribed limits, gradually closes the crack to its maximum extent. The latter procedure resulting in the microvalve having a normally open crack is illustrated herein, as preferable. A normally open crack is less likely to "freeze" closed during manufacture or while in use. In either instance the valve may be used indefinitely due to the instantly described pre-setting of the arms for movement within their elastic limits, thereby insuring against breakage of the tubes or abnormal distortion of the crack as a result of careless usage.

To lend to a clear understanding of the invention the normally open crack 30 in the inner tube member is shown on an enlarged or exaggerated scale. In actual practice it will be understood that the crack is comparatively rather minute in character and is not discernible to the eye when in closed position. When in open position the crack is discernible to the eye.

It is thought that the invention and many of its attendant advantages will be understood from the foregoing description, and it will be apparent that various changes may be made in the form, construction and arrangement of parts, and in the steps of the method and their order of accomplishment as herein described, without departing from the spirit and scope of the invention or sacrificing all of its material advantages, the form herein described being merely a preferred embodiment thereof.

What I claim is:

1. A microleak valve comprising an outer tube reversely bent at spaced intervals to provide a pair of integral angularly extending arms crossing one another with a normally constant clearance space therebetween, said arms being respectively communicably connected to separate sources of different gas pressures, an inner tube closed at one end and having a helical crack therein disposed within said outer tube intermediate said arms to provide an annular channel between the tubes, the open end of said inner tube being circumferentially secured to the inner wall of said outer tube sealing off said channel from communication with one of said arms, said crack when closed preventing communication between said arms and when open establishing communication therebetween, the closed end of said inner tube being locally secured to the inner wall of said outer tube to establish communication between said arms solely through said crack, and means for moving said arms towards one another to vary the width of said crack through the medium of opposed torque forces, thereby controlling gas leakage from one of said pressure sources to the other through said helical crack.

2. A microleak control valve comprising an outer glass tube reversely bent at spaced intervals to provide a pair of integral angularly extending arms disposed in crossed relation to each other with a normally constant clearance space therebetween to permit said tubes to be moved towards and away from one another within their elastic limits, said arms being respectively communicably connected to separate sources of different gas pressures, an inner tube of glass material closed at one end and having a helical crack of variable width therein to constitute a restricted valve orifice, said inner tube being snugly disposed within a straight portion of said outer tube intermediate said arms to provide a restricted annular channel between the tubes, the open end of said inner tube being circumferentially fused to the inner wall of said outer tube sealing off said channel from communication with one of said arms, the closed end of said inner tube being spot fused to the inner wall of said outer tube to establish communication between said arms solely through said crack, and a screw clamp engaging said tubes adjacent their locality of intersection for moving said arms towards one another to vary the width of said inner tube crack between fully open and closed positions through the medium of relative torque strains imposed upon said integrally and locally fused tubes, thereby providing variable means for controlling gas leakage in one direction through said arms from one of said pressure sources to the other through said helical valve crack only.

3. A microleak control valve comprising an outer tube reversely bent at spaced intervals to provide a pair of integral angularly extending arms crossing one another with a normally constant clearance space therebetween, said arms being respectively communicably connected to separate sources of different gas pressures, an inner tube closed at one end and having a normally open helical crack therein to constitute a restricted valve port, said inner tube being disposed within said outer tube intermediate said arms to provide an annular channel between the tubes, the open end of said inner tube being circumferentially secured to the inner wall of said outer tube sealing off said channel from communication with one of said arms, the closed end of said inner tube being locally secured to the inner wall of said outer tube to establish communication between said arms solely through said crack, and means for engaging and moving said arms towards one another to progressively close said inner tube crack through the medium of torque forces exerted in one direction on said tubes, release of said engaging means returning said crack to normal open position through the medium of inherent reactive torque force exerted in the opposite direction thereby variably controlling gas leakage from one of said pressure sources to the other through said valve arms and said helical valve crack.

4. A microleak control valve comprising an outer glass tube reversely bent at spaced intervals to provide a pair of integral angularly extending arms crossing one another with a normally constant clearance space therebetween, said arms being respectively communicably connected to separate sources of different gas pressures, an inner tube composed of glass closed at one end and having a helical crack therein to constitute a restricted valve port, said inner tube being disposed within a straight portion of said outer tube intermediate said arms to provide a narrow annular channel between the tubes, the open end of said inner tube being circumferentially fused to the inner wall of said outer tube sealing off said channel from communication with one of said arms, the closed end of said inner tube being spot fused to the inner wall of said outer tube to establish communication between said arms solely through said crack, and a screw clamp engaging said tubes at their point of intersection for progressively moving one of said arms towards the other to gradually close said inner tube crack through the medium of torque forces exerted in one direction on said inner tube, release of pressure exerted by said screw clamp returning said crack to normal open position through the medium of reactive torque forces exerted in the opposite direction, thereby variably controlling gas leakage from one of said pressure forces to the other through said valve arms and said helical valve crack.

5. A microleak control valve comprising an outer tube reversely bent at spaced intervals to provide a pair of integral tube arms extending angularly relative to each other in superposed relation with a normally constant clearance space therebetween, said arms being respectively communicably connected to separate sources of different gas pressures, and an inner tube closed at one end and having a helical crack therein disposed within said outer tube intermediate said arms to provide an annular channel between the tubes, the open end of said inner tube being circumferentially secured to the inner wall of said outer tube sealing off said channel from communication with one of said arms, the closed end of said inner tube being locally secured to the inner wall of said outer tube to establish communication between said arms solely through said crack, whereby gas leakage from one of said pressure sources to the other through said helical crack may be variably controlled by torque forces resulting from relative movement of said arms within their elastic limits defined by said clearance space therebetween, to progressively open and close said crack.

6. A microleak control valve comprising an outer glass tube reversely bent at spaced intervals to provide a pair of integral angularly extending arms disposed in crossed relation to each other with a normally constant clearance space therebetween, said tube arms being communicably connected at their outer ends respectively to separate sources of high and low gas pressures, an inner glass tube closed at one end and having a helical crack therein to constitute a restricted normally open valve orifice, said tube being disposed within a substantially straight portion of said tube between said arms to provide a restricted annular channel between the tubes, the open end of said inner tube being circumferentially fused to the inner wall of said outer tube in a ring seal to shut off communication between said channel and one of said arms, the closed end of said inner tube being locally spot welded to the inner wall of said outer tube to establish communication between said arms solely through said helical crack, whereby gas leakage from the higher of said pressure sources to the lower through said helical crack may be variably controlled by torque forces resulting from relative movement of said arms within their elastic limits defined by said clearance space therebetween, respectively to close and open said crack, the crack opening movement of said arms away from each other being caused by inherent reactive torque forces relatively present in said inner and outer tubes.

7. A microleak valve, comprising a glass outer tube reversely bent at its opposite ends to provide a pair of reversely extending inherently resilient arms crossing one another with a normally constant clearance space therebetween, said arms being respectively communicably connected to separate sources of different gas pressures, an inner glass tube closed at one end and having a normally open helical crack therein snugly fitting within said outer tube intermediate said arms to provide a restricted annular channel between the tubes, the open end of said inner tube being fused to the inner wall of said outer tube in a ring seal, the closed end of said inner tube being spot fused to said outer tube, and a screw clamp for moving said crossed arms towards one another to gradually close said inner tube crack through the medium of relative torque strains in said tubes respectively, thereby controlling gas leakage from one of said pressure sources to the other through one of said arms and thence solely through said helical crack to the other of said arms.

8. A valve, comprising, a tubular element, a tubular wall portion of vitreous material sealed within said tubular element for obstructing fluid passage therethrough, said tubular wall portion having a substantial length along the longitudinal axis of said tubular element and secured at its terminal ends thereto, said tubular wall portion having a helicoidal crack therein that may be opened by forcible distortion of said tubular element to permit fluid passage therethrough, said crack extending longitudinally of said tubular wall portion and being initially internally stressed in the sense to close the crack, whereby said crack may be opened by stressing the wall portion in the opposite sense by correspondingly distorting said tubular element.

9. A valve, comprising, a tubular element, a tube disposed within said tubular element and having a helicoidal crack therein that may be opened by forcibly twisting said tube, one end of said tube being closed and secured to an adjacent portion of said tubular element, the other end of said tube being open and sealed to the surrounding portion of the tubular element throughout the entire periphery of said tube, said tube being initially internally stressed in the sense to close the crack, whereby it may be opened by stressing it in the opposite sense by correspondingly twisting the tubular element.

JOHN J. HOPFIELD.

References Cited in the file of this patent

UNITED STATES PATENTS

| Number | Name | Date |
|---|---|---|
| 1,274,576 | Moeller | Aug. 6, 1918 |
| 1,669,568 | McGee | May 15, 1928 |
| 2,119,009 | Elias | May 31, 1938 |
| 2,215,041 | Hostetter | Sept. 17, 1940 |
| 2,300,917 | Gaskill | Nov. 3, 1942 |
| 2,512,281 | Lofstrand | June 20, 1950 |

FOREIGN PATENTS

| Number | Country | Date |
|---|---|---|
| 23,843 | Great Britain | 1892 |